United States Patent [19]

Nozick

[11] Patent Number: 4,697,874

[45] Date of Patent: Oct. 6, 1987

[54] DISTRIBUTION FRAME FOR OPTICAL CABLES

[76] Inventor: Jacques E. Nozick, 28 rue Broca, 75005 Paris, France

[21] Appl. No.: 808,806

[22] Filed: Dec. 13, 1985

[30] Foreign Application Priority Data

Dec. 14, 1984 [FR] France ................................ 84 19201

[51] Int. Cl.$^4$ .............................................. G02B 6/44
[52] U.S. Cl. ................................ 350/96.23; 350/96.20
[58] Field of Search ............... 350/96.20, 96.21, 96.22, 350/96.23

[56] References Cited

U.S. PATENT DOCUMENTS 4,585,303 4/1986 Pinsard et al. ................... 350/96.20

Primary Examiner—Robert E. Wise
Attorney, Agent, or Firm—Sughrue, Mion, Zinn Macpeak and Seas

[57] ABSTRACT

A distribution frame for optical cables constituted by a plurality of cores (12) each supporting a plurality of optical fibers (13). The distribution frame comprises at least one cable head including at least one cassette (4) and a vertical duct (1), said duct is a generally channel section member having longitudinally extending grooves therein, and supports at least one tray (7) for jumpers (9). Adjacent each cassette (4) and inside the duct (1) there are storage means for receiving the cores (12), and advantageously constituted by drums (6) which are relatively displacable inside the duct in a vertical direction. The ducts also support, on their outside, three-way drums (22) associated with each cassette (4) and placed at the back of the cable head, and front drums (5) likewise associated with each cassette (4), said three-way drums (2) and front drums (5) serving to guide the jumpers (9). Each cassette (4) includes storage means for receiving the optical fibers (13) and advantageously constituted by drums (15). The various above-mentioned are each constituted by circular arcuate portions of radius approximately equal to the minimum radius of curvature appropriate the item wound around or guided by the drum in question, i.e. appropriate to cable cores (12), optical fibers (13), or jumpers (9), as the case may be.

10 Claims, 5 Drawing Figures

DISTRIBUTION FRAME FOR OPTICAL CABLES

BACKGROUND OF THE INVENTION

The present invention relates to a distribution frame for optical cables.

BACKGROUND OF THE INVENTION

The use of cables, whether they be electrical or or more transmitters to one or more receivers (for example telephone or television transmitters and receivers) requires a buffer distribution installation to be placed between the transmitter(s) and the receiver(s) (referred to as a "distribution frame") at which each line, and in particular each receiver line, is capable of being isolated.

Installations of this kind are common practice in telephone exchanges. Generally speaking, such installations comprise ranks of distribution columns (also known as "cable heads"), each of which generally comprises a vertically disposed metal duct together with modules for performing various functions. Some of these modules are connected to the telephone exchange by means of a cable which enters the duct via its top or its bottom. Modules fixed to the various cable heads may be connected by conductors (known as "jumpers") which follow specific paths lying outside the distribution frame. The disposition and the cabling of such installations must satisfy two main requirements: firstly optimum use must be made of the space available, and secondly it must be easy to provide a wide variety of connections. Given the large amount of traffic passing through such distribution frames and the number of receivers (and sometimes transmitters) which number may be very high, it is imperative to house a maximum of connections in a minimum amount of space, while still making it possible to readily interchange the connections.

Distribution frames for optical cables need to satisfy the above-mentioned conditions, but these conditions cannot be satisfied in the same way as for cables having metallic conductors since the very nature of optical fibers means that optical fiber cables are less flexible in use than are cables having metallic conductors. In particular, optical fibers have a minimum radius of curvature which must not be transgressed, and they are fragile in traction.

SUMMARY OF THE INVENTION

The present invention provides a distribution frame for optical cables, where each optical cable is constituted by a plurality of cores, and each core supports a plurality of optical fibers, said distribution frame comprising at least one cable head comprising at least one distribution cassette and a vertical, grooved, channel section duct supporting at least one tray for jumpers, said duct including, adjacent to each cassette and inside said channel section, storage means for receiving a cable core. Generally speaking, the outside of each duct is also fitted with a three-way drum adjacent to each cassette and on the back of the cable head, and a front drum for guiding the jumpers.

Each cassette in the distribution frame in accordance with the invention comprises a housing, a removable plate for supporting at least one connector or at least one multiplexer, a cover, and storage means for receiving optical fibers.

Preferably, the storage means for receiving optical fiber cable cores and the storage means for receiving optical fibers include drums.

The drums for receiving the cores, the drums for receiving the fibers, and also the three-way drums and the front drums should all comprise at least a portion which is circular and has a radius which is at least approximately equal to the minimum radius of curvature for the cores, the optical fibers, and the jumpers, as the case may be.

Advantageously, parallel duct risers are separated from one another by a distance equal to about twice the limiting radius of curvature for the cores.

BRIEF DESCRIPTION OF THE DRAWINGS

An embodiment of the invention is described by way of example with reference to the accompanying drawings, in which:

FIG. 5 is a simplified front view of three cable heads in a distribution frame in accordance with the invention.

DETAILED DESCRIPTION OF THE PREFERRED EMBODIMENTS

Figure 1:
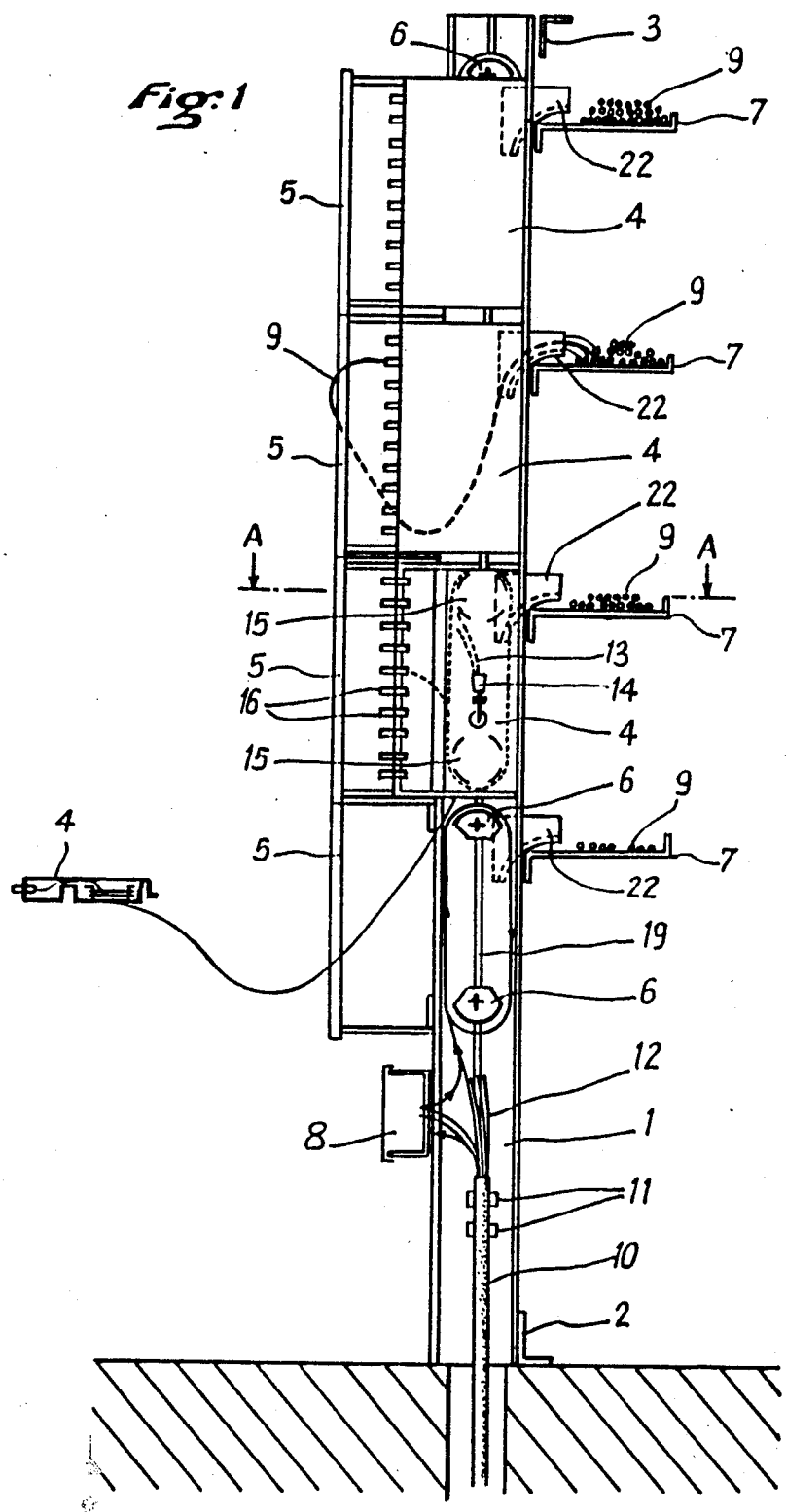
FIG. 1 is a right side view of an opticl fiber cable head in accordance with the invention.

The optical fiber cable head shown in FIG. 1 comprises a channel section duct 1 which is fixed in place by brackets 2 and 3 disposed at the bottom and at the top thereof. The duct is made of metal (generally aluminum) and includes a longitudinally extending groove for rapidly fixing various components thereto. Such components are generally snap-fitted to the duct 1 and include magazines or cassettes 4, drums 5 and 6, trays 7 for "jumpers" (where the term "jumper" 9 is applied to a length of optical fiber for interconnecting two cassettes), sheaths 8, etc. An optical cable 10 including a given number of cores 12 (for example ten) each supporting a given number of optical fibers 13 (for example ten), enters the cable head from the top or the bottom (it enters via the bottom in FIGS. 1 and 5) of the duct 1, and is fixed thereto by cable-fixing means 11. The cores 12 spread out beyond the cable fixing means and are fed to one (or more) sheath(s) 8 and/or cassettes 4. In theory, each core 12 feeds only one cassette 4. Adjacent each cassette 4, the duct 1 contains two drums 6 which are capable of being moved vertically and which are intended to receive and to store the excess length of the incoming core. Since it is difficult to extend an optical fiber (and a fortiori a core containing several optical fibers), and since it is desirable to be able to freely change the connections in a given cable head, the cores are always left with some degree of excess length. Furthermore, the excess length of core makes it possible to remove a cassette from the duct 1 and to place it at some distance from the duct on a horizontal support, for example in order to perform work thereon, if necessary. Each core 12 thus has a variable fraction of its length wound around two drums 6 inside the duct 1, thereby making use of the duct as a kind of protective enclosure. The end of each core then enters a cassette 4 where the optical fibers 13 carried by the core are separated from the core and appropriate lengths thereof are wound round two drums 15 in the cassette prior to the ends 14 of the fibers being connected 16 to connectors or to a multiplexer. An excess length of each fiber is stored in the cassettes for the same reason as an excess length of core is stored on the drums 6. Glass fibers are extremely difficult to extend, and they must therefore be initially installed with more than enough length to cover all possible future events. In particular, it must be possible to undo and remake connections at will within each cassette.

Figure 2:
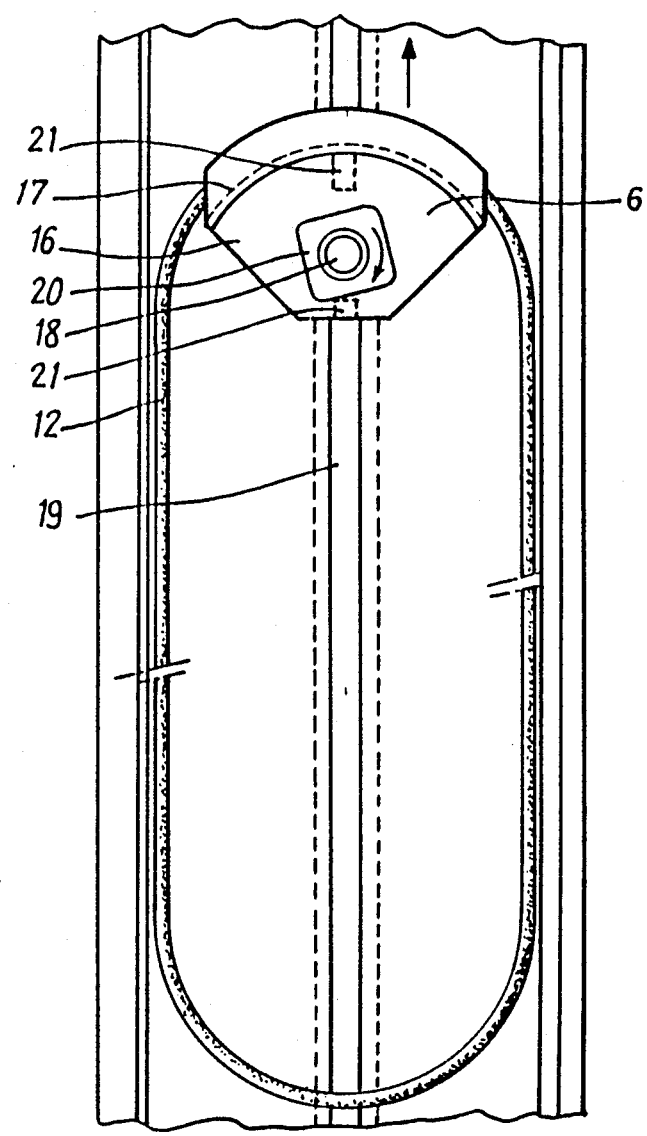
FIG. 2 is a front view of an adjustable corereceiving drum.

Thus, in an optical cable head in accordance with the invention, two successive storage regions are provided for excess lengths of glass fiber from a single core:

The first storage region is inside the duct 1 and is the region where each core is wound around said two drums 6. The second storage region is inside each cassette 4 where the individual fibers carried by each core are separated therefrom and individually wound around two drums 15. The drums 6 and 15 are not identical, the drums 6 are adjustable in position whereas the drums 15 are not, but they share common features such as being constituted by sectors of a disk extending over an angle of not more than about 90° and having a radius which is approximately equal to the minimum permissible radius of curvature for the optical fibers. As can be seen in FIG. 1, the drums 15 comprise four circular arcs each extending over about 30° and regularly disposed around a circular circumference. The positions of the arcs inside the cassettes 4 are fixed. In contrast, the drums 6 are movable within the ducts 1. In FIG. 2, it can be seen that the drums 6 are constituted by a sector of a disk having an angle at the center equal to about 90° and including a circular flange 17 for holding the or each turn of core 12 wound thereon. The drums 6 may occupy up to ⅔ or even ¾ of the space between the parallel risers of the channel section bar which constitutes the duct 1, thereby enabling a considerable length of core to be stored since the channel section is approximately square and the side of the square is slightly greater than twice the minimum permissible radius of curvature for the optical fibers (in order to make the installation as a whole as compact as possible). Each drum 6 is fixed to the duct 1 by means of a bolt 18 passing therethrough which the head of the bolt being held captive in a longitudinal T-shaped groove 19 running long the middle of the web of the channel section bar which constitutes the duct and with a nut 20 screwed onto the other end of the bolt and being suitable for tightening by hand (e.g. a knurled nut) so that the positions of the drums 6 along the duct 1 can be adjusted by hand. In addition, the drums 6 include guide pegs 21 projecting from their rear surfaces and received in the groove 19 to prevent the drums 6 from rotating about their fixing bolts 18. The ease with which the drums may be moved, and the relatively large thickness thereof relative to the cross-section of the cores 12 makes for very flexible storage with a large maximum capacity.

Figure 3:
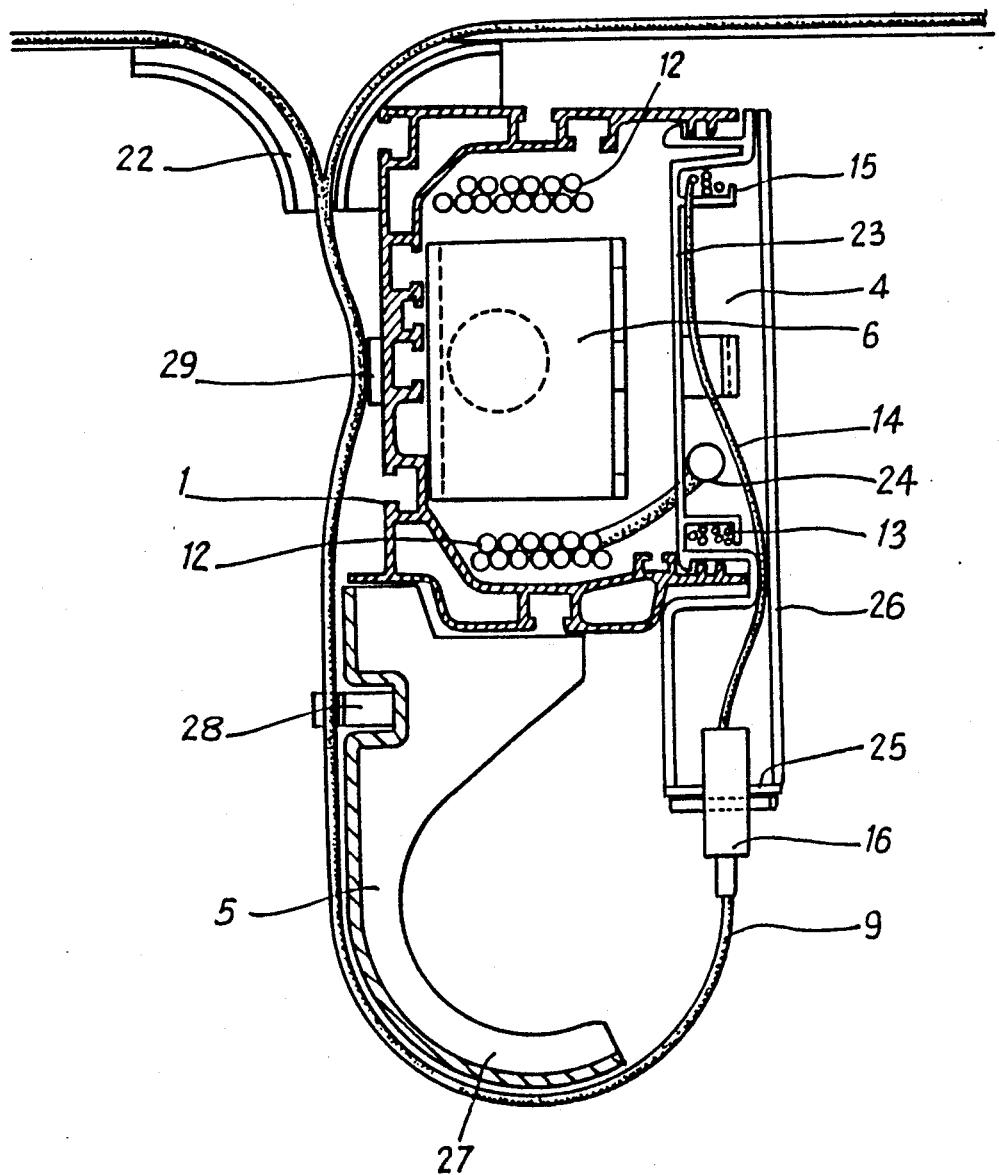
FIG. 3 is a horizontal cross-section on a line A—A through the cable head shown in FIG. 1.

FIG. 3 is a cross-section through the FIG. 1 cable head on a line A—A and shows the detail of the device at cassette level. This figure shows the channel section bar having numerous longitudinal grooves (i.e. the duct 1) with a drum 6 fixed to the inside thereof and having a core 12 wound thereabout. The figure also shows a cassette 4, a front drum or guide 5, and a three-way drum or guide 22. The cassette 4 comprises a housing 23 which is snap-fastened to the duct 1 and which includes drums 15 around which the optical fibers 13 are wound.

The cassette also has: an orifice 24 for receiving the core 12; a removable plate 25 on which the connectors 16 or multiplexers 16 16 are fixed; and a cover 26. In FIG. 1 the top two cassettes 4 are shown with their covers 26 in place. The length and the thickness of the cassette housings may be varied according to requirements. If a housing is used which is longer than a standard housing as shown in FIG. 3, a spacer is used between the duct 1 and the front drum 5 so that the radius of curvature of the fiber contained in the jumper 9 is not reduced below the minimum value. The front drum 5 has a cylindrical portion 27 whose radius is approximately equal to the minimum radius of curvature for the optical fibers and which extends over an arc of about 120°. In order to ensure that the jumpers 9 are not subjected to stresses greater than the maximum allowable stresses, it is important that the end of the circular portion 27 should be at a fixed distance from the connectors 16. That is why it is necessary to have a spacer when using cassettes which are longer than standard size cassettes. In order to hold the jumpers 9 pressed against the front drum 5, automatically-closing jumper-fixing means 28 of known type are fixed thereto. Any excess length of jumper may be stored in a storage space situated between the front drum 5 and the back of the duct 1. This space is open on one side and is rearwardly limited by the three-way drums 22, on the other side it is limited by the central web of the duct 1, and to the front it is limited by the projection of the front drum 5 which is advantageously offset sideways relative to the central web of the duct 1. In order to prevent the jumper loop from moving away from the duct 1, quick-action fastenings 29 are disposed along the duct (e.g. of the Velcro type, or equivalent).

It has been mentioned above when describing an optical cable head in accordance with the invention (either inside the duct 1 or inside each cassette 4), that the use of optical fibers imposes constraints due to the existence of a minimum permissible radius of curvature and to the effective impossibility of readily lengthening a core or an optical fiber if it turns out to be too short. The same problems naturally arise for the fiber circuits existing outside the cable head, and in particular for the jumpers. In order to solve these problems, several special arrangements are used and the jumpers 9 are caused to follow paths which are established by a well-defined process.

Figure 4:
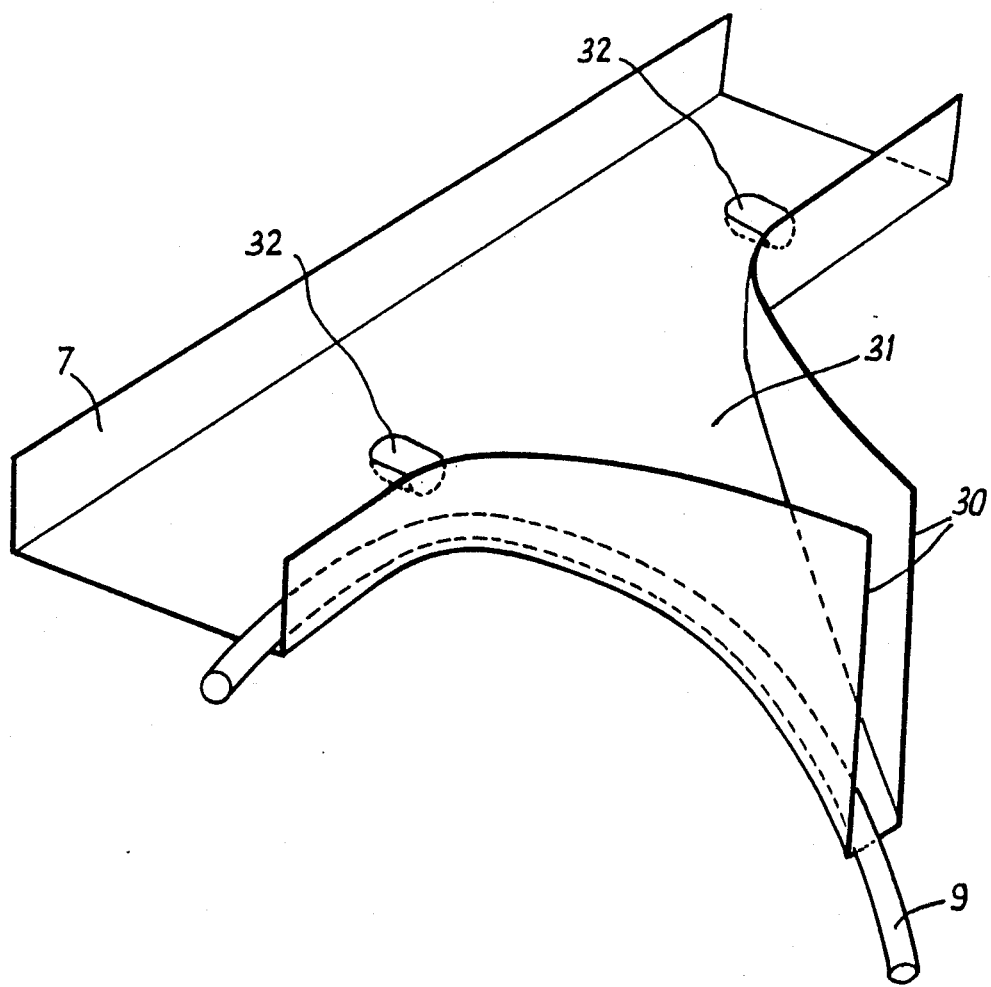
FIG. 4 is a simplified perspective view showing how a three-way drum and a horizontal jumper tray come together.
Figure 6:
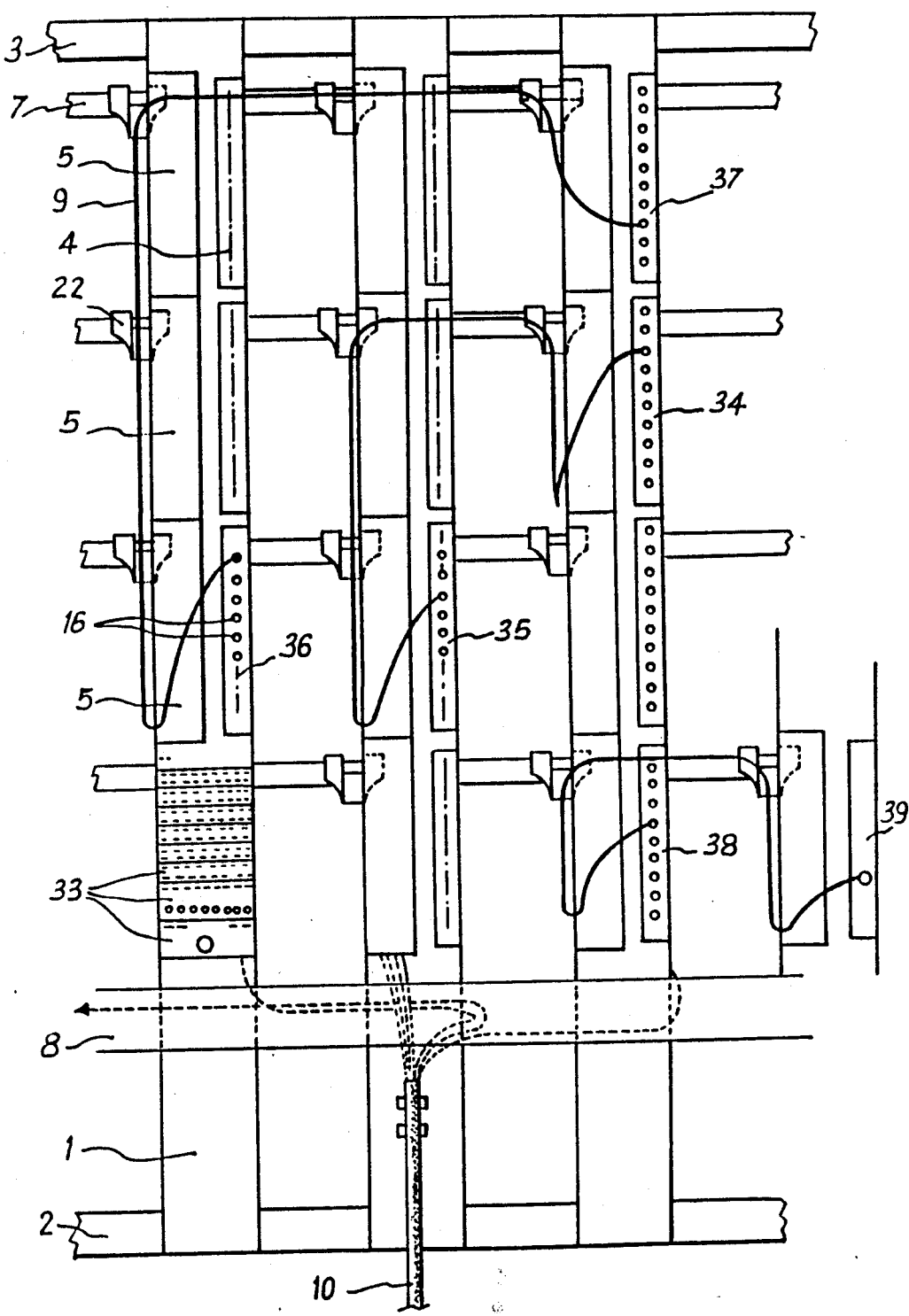

The special arrangements include the above-mentioned front drums 5, the trays 7 for horizontal jumpers, and the three-way drums 22 which are advantageously disposed on the back of the cable head. FIG. 4 shows a three-way drum or guide through 22: it comprises two curved vertical walls 30 and a sloping portion 31 which is also curved. The radius of curvature of each of these walls is approximately equal to the minimum permissible radius of curvature for an optical fiber. In addition the drum shown in FIG. 4 includes two guide fingers 32 for holding jumpers in the tray portion of the drum. The three-way drum 22 together with the adjacent trays 7 (not shown) are fixed to the ducts 1 level with each cassette stage, and beneath the top connector 16 of each cassette stage.

Examples of jumper paths are shown in FIG. 5. This figure shows three cable heads, one of which (the left-hand cable head) is unusual in that it includes both cassettes 4 for optical fiber cables and modules 33 which are connected to metallic cables, e.g. modules for connection to copper cables, to coaxial cables, or to racks containing electronic circuits or optoelectronic circuits. The other two cable heads each include four cassettes 4 (where the number of cassettes is arbitrary). The method used for establishing the path of a jumper 9 between two connectors 16 situated on two different cable heads includes the following steps: the jumper 9 is pressed against the front drum 5; it is held by an automatically-closing jumper-fixing means 28; any excess length of jumper is stored in a loop running along the central web of the duct 1 and it is held in place by means of the quick fastener 29; the jumper then follows a rising path (and this is always the case) up to a three-way drum 22 (if the destination cassette is situated at the same level or at a lower level than the starting cassette, then the three-way drum 22 used is the drum belonging to the starting cassette, and if the destination cassette is situated higher than the starting cassette, then the three-way drum used is the drum belonging to the cassette located on the same cable head as the starting cassette and at the same level as the destination cassette); the jumper is then run along the tray 7 into which the appropriate three-way drum 22 opens out until it reaches the three-way drum fixed to the cable head of the destination cassette; the jumper then follows a downward path to the destination cassette; finally, the jumper is connected to the selected connector after being fixed to the associated front drum 5 and after any excess length has been stored in a loop as before.

Three types of path are shown in FIG. 5:

The starting cassette is located higher up than the destination cassette; this is true for the jumpers interconnecting cassettes 34 and 35 and cassettes 37 and 36;

The starting cassette is situated at the same level as the destination cassette: this is true of the jumper interconnecting cassettes 38 and 39; and The starting cassette is situated at a lower level than the destination cassette: this is true of the jumpers interconnecting the cassettes 36 and 37 and the cassettes 35 and 34.

The present invention is not limited to the specific embodiments described above, and is applicable to any modifications falling within the scope of the claims.

What is claimed is:

1. A distribution frame for optical cables (10) each including a plurality of cores (12), and each core supporting a plurality of optical fibers (13), said distribution frame comprising: at least one cable head comprising a vertically elongate, grooved, channel section duct (1) and at least one optical fiber distribution cassette (4) mounted on said duct, said cassette being fitted with at least two fiber connectors (16), a plurality of jumper fibers (9) for individual coupling between connectors of different cassettes, said duct including, adjacent to each cassette and inside said channel section, storage means (6) for storing excess length loops of cable cores, and guide means (22) mounted on the outside of the duct for changing the direction of jumpers disposed therein.

2. A distribution frame according to claim 1, wherein said guide means compries a three-way drums.

3. A distribution frame according to claim 2, wherein said three-way drum comprises two curved verticl walls (30) and a curved sloping wall (31), with the radius of curvature of each of the walls being approximately equal to a minimum radius of curvature of the jumpers.

4. A distribution frame according to claim 2, wherein said three-way drum further includes at least two guide fingers 32 for guiding said jumpers.

5. A distribution frame according to claim 1, further comprising a front drum (5) mounted on the outside of said duct for guiding jumpers led therearound.

6. A distribution frame according to claim 5, wherein said front drum compries a portion of a cylinder extending over an angle of not more than about 120° and having a radius approximately equal to a minimum radius of curvature of the jumpers.

7. A distribution frame according to claim 1, wherein the width of the channel section between two opposite, parallel flanges of said duct is approximately twice a minimum radius of curvature for the cable cores.

8. A distribution frame according to claim 1, wherein a central web of said channel section duct has a longitudinally-extending groove (19) running along its inside face for mounting said storage means.

9. A distribution frame according to claim 1, wherein said core storage means inside said duct comprises sectors.

10. A distribution frame according to claim 9, wherein said drum sectors are vertically displaceable and extend over not more than about 90°, the radius of said sectors being approximately equal to a minimum radius of curvature of said cores; said drum sectors also including a circular flange, a hole perpendicular to parallel faces of said sector for passing a bolt (18) having its head held captive in a longitudinally-extending groove (19) in a central web of said duct, and at least one guide peg (21) disposed in said groove.

* * * * *